United States Patent
Coast et al.

(10) Patent No.: US 10,464,383 B2
(45) Date of Patent: Nov. 5, 2019

(54) AMPHIBIOUS TRANSPORT SYSTEM

(71) Applicants: John Burnett Coast, Baton Rouge, LA (US); John Stewart Coast, Baton Rouge, LA (US)

(72) Inventors: John Burnett Coast, Baton Rouge, LA (US); John Stewart Coast, Baton Rouge, LA (US)

(*) Notice: Subject to any disclaimer, the term of this patent is extended or adjusted under 35 U.S.C. 154(b) by 206 days.

(21) Appl. No.: 15/861,377

(22) Filed: Jan. 3, 2018

(65) Prior Publication Data
US 2018/0194181 A1 Jul. 12, 2018

Related U.S. Application Data

(60) Provisional application No. 62/441,836, filed on Jan. 3, 2017.

(51) Int. Cl.
*B60F 3/00* (2006.01)
*B60P 3/10* (2006.01)

(52) U.S. Cl.
CPC .......... *B60F 3/0015* (2013.01); *B60F 3/0038* (2013.01); *B60F 3/0061* (2013.01); *B60F 3/0092* (2013.01); *B60P 3/1033* (2013.01)

(58) Field of Classification Search
CPC .... B60F 3/0015; B60F 3/0038; B60F 3/0061; B60F 3/0092
See application file for complete search history.

(56) References Cited

U.S. PATENT DOCUMENTS

| 4,433,634 A | 2/1984 | Coast |
| 4,645,023 A | 2/1987 | Rea et al. |

(Continued)

FOREIGN PATENT DOCUMENTS

RU 148303 11/2014

OTHER PUBLICATIONS

Developing new-generation machinery for vegetation management on protected wetlands in Poland, A.P. Dubowski et al., Mires and Peat, vol. 13 (2013/14), Article 11, 1-13 (http://www.mires-and-peat.net/).

(Continued)

*Primary Examiner* — Ajay Vasudeva
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

An amphibious transport apparatus includes forward and aft ends, a pair of spaced apart pontoons including tracks, and a transversely extending structure, which can include a platform, that spans between the pontoons and connects the pontoons together. The amphibious transport apparatus further includes a sled vessel that can be used to transport materials or personnel. The sled can be releasably attached to the amphibious transport apparatus with tow bar and a pivotal connection. Said tow bar can be rotatable between an upper storage position wherein the tow bar engages the vessel away from said pivotal connection and above a terrain surface, and a lower towing position. A towing position of said amphibious craft and sled can be defined by the sled connected to the amphibious craft at the releasable pivotal connection, with the amphibious craft being self propelled with said tracks for engaging the underlying terrain and with the sled in the lower towing position so that the sled bottom drags along on the underlying terrain during movement of the amphibious transport apparatus and sled. A trailer for loading and unloading the sled can also be provided. The amphibious craft can push the sled onto the trailer during loading.

35 Claims, 20 Drawing Sheets

(56) References Cited

U.S. PATENT DOCUMENTS

| | | | | |
|---|---|---|---|---|
| 4,872,413 | A | * | 10/1989 | Hebert .................. A01K 80/00 |
| | | | | 440/12.7 |
| 4,934,300 | A | | 6/1990 | Seligman et al. |
| 4,961,395 | A | | 10/1990 | Coast |
| 5,199,372 | A | | 4/1993 | Seligman et al. |
| 5,899,164 | A | | 5/1999 | Coast |
| 7,021,228 | B2 | | 4/2006 | Robb |
| 8,388,038 | B2 | | 3/2013 | Hastings |
| 8,528,672 | B2 | | 9/2013 | Martel |
| 8,827,014 | B2 | | 9/2014 | Martel |
| 9,630,465 | B2 | * | 4/2017 | Coast .................... B60F 3/0015 |
| 2010/0005857 | A1 | | 1/2010 | Zhang et al. |
| 2017/0282661 | A1 | * | 10/2017 | Butler .................. B60F 3/0092 |

OTHER PUBLICATIONS

Marsh Buggy Use in the Coastal Zone, Operational Standards compiled by Louisiana Department of Natural Resources—Coastal Management and Coastal Restoration Divisions, and the Louisiana Department of Wildlife and Fisheries—Habitat Conservation Division (Nov. 2000).

* cited by examiner

AMPHIBIOUS TRANSPORT SYSTEM

CROSS-REFERENCE TO RELATED APPLICATIONS

This application claims benefit of U.S. Provisional Patent Application Ser. No. 62/441,836, filed 3 Jan. 2017, which is hereby incorporated herein by reference.

Priority of U.S. Provisional Patent Application Ser. No. 62/441,836, filed 3 Jan. 2017, which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved method and apparatus for transporting personnel and/or equipment in a marsh or swamp environment using an amphibious tow vehicle and a sled of improved configuration. In one embodiment, the method of the present invention enables loading and unloading of the sled from a trailer, wherein the amphibious track vehicle can be used as part of the method during loading and/or unloading of the sled to the trailer or transport vehicle. In one embodiment, the present invention includes an amphibious vehicle, sled and transport trailer.

2. General Background of the Invention

Amphibious marsh craft are commercially available and have been in use for transporting personnel and equipment to remote aquatic locations such as in marshy areas or in swamps, or in areas that are prone to flooding. Examples of such track amphibious vehicles can be seen for example in U.S. Pat. Nos. 4,433,634; 4,961,395; and 5,899,164, naming inventor John B. Coast. Each of the above discussed patents are hereby incorporated herein by reference.

A problem that exists with such amphibious craft is that they have very little storage space for the placement of equipment or materials thereon. These vehicles are limited in square footage that can be used for cargo because the pontoons of the vehicles have tracks that move around the pontoons. The track area is thus not suitable for placement of articles or personnel to be transported. Such amphibious track vehicles have only limited suitability for operations of tasks such as sandblasting, painting, or the like, because the platforms are elevated above and located in between the pontoons and tracks. Because these amphibious craft float on pontoons, they require some elevation for the operator's platform to be above the water surface. Too much weight could submerge the operator's station or engine or controls or other components.

The amphibious track vehicle is able to tow a sled even when crossing a body of water, such as a lake or river. When crossing a lake or river, if too much weight is loaded onto the amphibious vehicle, the vehicle becomes inefficient. The amphibious craft has two pontoons and if the craft is needed to carry too much weight, the craft is inefficient in water. The amphibious vehicle/craft has a maximum load carrying capacity of about 2,000 pounds.

BRIEF SUMMARY OF THE INVENTION

The apparatus and method of the present invention solves the problems confronted in the art in a simple and straightforward manner. What is provided is an amphibious transport apparatus and method that includes a trailer in the form of a sled. In some embodiments an amphibious transport apparatus includes both a sled and a trailer for the sled. The amphibious craft preferably has forward and aft ends, a pair of spaced apart pontoons, and a transversely extending structure that spans between the pontoons and connects the pontoons together. The transversely extending structure can include a platform having a user's control station and a transom in front of the aft end of said amphibious craft.

A sled vessel can preferably releasably attach to the amphibious transport apparatus. The sled vessel preferably has a bottom, side walls extending up from the bottom, forward and aft rakes, and a tow bar pivotally attached to the vessel at one of the rakes, wherein a releasable connection, e.g., a pivotal connection, can enable the tow bar to releasably attach to the amphibious craft at said transom. In one embodiment, a movable ramp can be opened or closed at a rake.

The releasable connection can include a first connecting part on the amphibious craft and a second connecting part on the tow bar. The tow bar can be rotatable between an upper storage position wherein the tow bar engages the vessel away from the pivotal connection and a lower towing position.

A towing position of the amphibious craft and sled can be defined by the sled connected to the amphibious craft with first and second connecting parts, the amphibious craft preferably being self propelled with the tracks engaging the underlying terrain and with the sled bottom dragging on the underlying terrain during movement together of the amphibious craft and sled.

In one embodiment, in the lower towing position the second connector portion is preferably above the sled vessel bottom.

In one embodiment, the sled vessel has a length and the rakes have a combined length that is preferably about half the length of the sled vessel.

In one embodiment, the tow bar preferably attaches to the amphibious craft at a position in between the pontoons.

In one embodiment, the sled bottom is preferably lined with a polymeric layer of material.

In one embodiment, the sled bottom and part of the rakes are preferably lined with a layer of polymeric material.

In one embodiment, at least a part of the sides of the sled are preferably lined with a layer of polymeric material.

In one embodiment, at least part of the bottom and at least part of the rakes is preferably covered with a layer of polymeric material.

In one embodiment, the amphibious craft has a length and the sled has a length that is preferably greater than the length of the amphibious craft.

In one embodiment, the amphibious craft has a towing capacity and the sled when connected to the amphibious craft with the first and second connectors preferably generates a drag on the amphibious craft that is less than half of the towing capacity.

In one embodiment, the amphibious craft has a towing capacity and the sled when connected to amphibious craft with said first and second connectors preferably generates a drag on the amphibious craft that is less than twenty five percent of said towing capacity.

In one embodiment, the amphibious craft has a towing capacity and the sled when connected to the amphibious craft with the first and second connectors preferably generates a drag on the amphibious craft that is less than ten percent of said towing capacity.

In one embodiment, the amphibious craft has forward and reverse mobility and wherein the amphibious craft preferably pushes the sled when in reverse, as part of the method.

In one embodiment, the amphibious craft and sled are so configured in the connected position that the amphibious craft is preferably able to push the sled into a body of water wherein the amphibious craft is above the sled is in a higher position on land while the sled bottom is in a lower position on a water surface of said body of water.

In one embodiment, the amphibious craft and sled are so configured in the connected position that the amphibious craft is preferably able to push the sled upwardly and upon the bed of an inclined trailer wherein the amphibious craft is below the sled bottom, engaging an underlying terrain (the earth) while the sled bottom is at a higher position engaging the bed of the inclined trailer.

In one embodiment, the amphibious craft and sled are so configured in the connected position that the amphibious craft is preferably able to push the sled upwardly and upon the bed of an inclined trailer wherein the amphibious craft is below the sled on an underlying terrain (earth's surface) while the sled is in a higher position resting or sliding on the bed of the inclined trailer. In an embodiment of the method, a method of transporting personnel and or equipment to a remote locale that includes marsh, wetland and/or water, comprises the steps of:

a) providing an amphibious craft having a pair of forward and aft ends, spaced apart pontoons, a transverse platform that spaces the pontoons apart with an operator's control station provided on the platform and the platform having a transom in front of said aft end, endless tracks around each pontoon and a drive system that drives the tracks relative to the pontoon, said drive system enabling the craft to travel in forward or reverse directions;

b) providing a sled having a bottom, side walls, forward and aft rakes and a cargo deck that has an area greater than the area of said platform;

c) connecting the sled to the amphibious craft with a tow bar that is pivotally attached to the sled and pivotally attached to the transom of the amphibious craft to define a connected position;

d) selectively pulling or pushing the sled with amphibious craft when in said connected position;

e) wherein the connected position is so configured that the sled can be pushed when the sled bottom is selectively either above the amphibious craft or below the amphibious craft; and f) filling the sled cargo deck with personnel and/or equipment to be transported.

In one embodiment, the method further comprises the step of providing a trailer having a bed that is preferably movable between an inclined loading position and a travel position, wherein in step "e" the trailer bed is in the inclined loading position and further comprising the step of the amphibious craft pushing the sled upon the bed.

In one embodiment, the method further comprises placing a layer of polymer on the bottom of the sled.

In one embodiment of the method, in step "c" the tow bar can be pivoted above the top of the sled.

In one embodiment of the method, in step "c" the tow bar can be pivoted below the bottom of the sled.

In one embodiment of the method, in step "c" the tow bar connector is preferably a universal joint.

In one embodiment, the amphibious craft can have a maximum load carrying capacity of about 2,000 pounds.

In one embodiment, the sled vessel can have a load carrying capacity of about 2,000-5,000 pounds.

In one embodiment, the sled vessel preferably has a load carrying capacity of about 3,500 pounds.

In one embodiment, the sled vessel can have a greater length than the length of the amphibious craft.

In one embodiment, a load carrying capacity of the sled vessel is preferably greater than a load carrying capacity of the amphibious craft.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
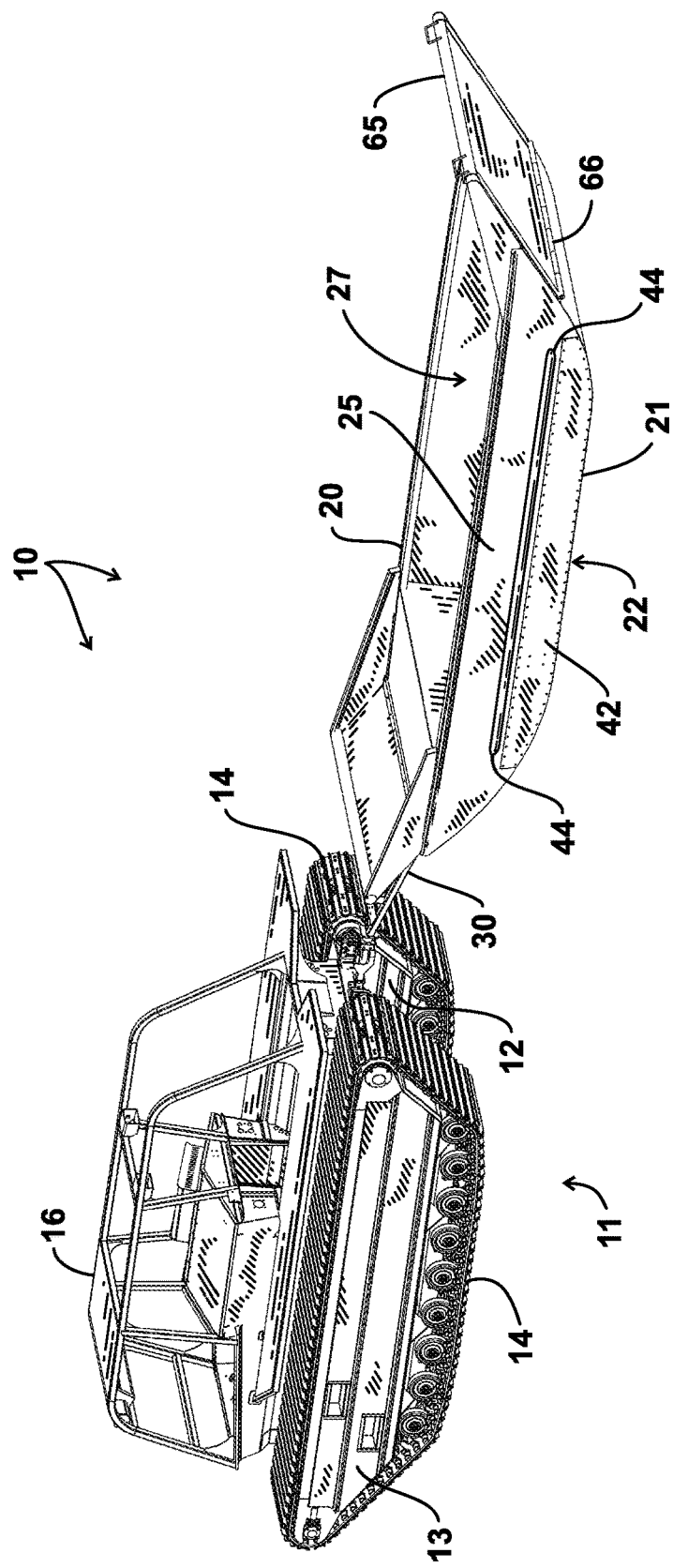
FIG. 1 is a side perspective view of a preferred embodiment of the apparatus of the present invention.
Figure 2:
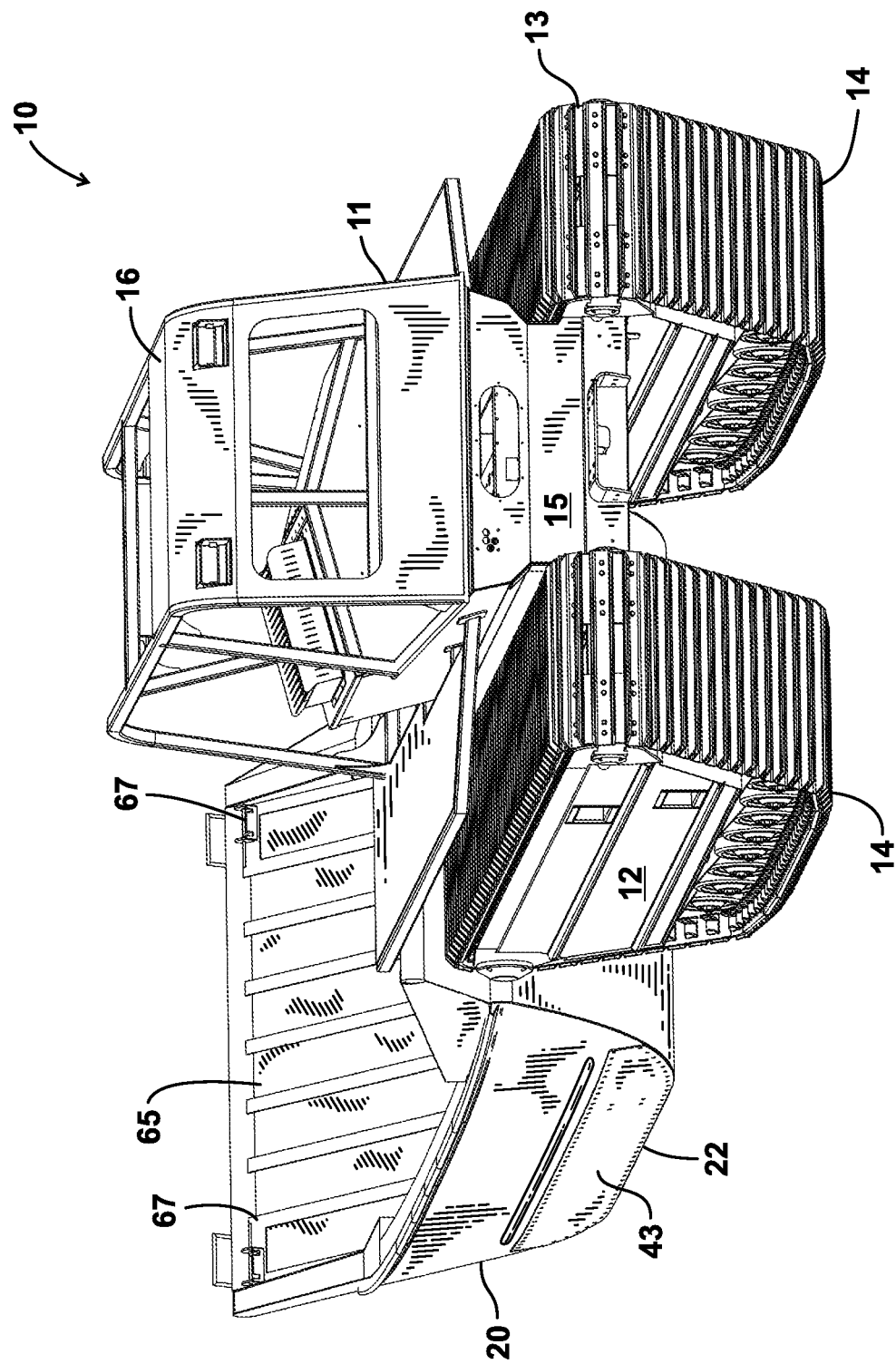
FIG. 2 is a front perspective view of a preferred embodiment of the apparatus of the present invention.

FIGS. 1-20 show a preferred embodiment of the apparatus of the present invention designated generally by the numeral 10. Amphibious transport system 10 employs an amphibious vehicle 11 which can be a tow vehicle in one embodiment of a method of the present invention. The amphibious vehicle (designated generally by the numeral 11 in the drawings) can be a double pontoon tracked vehicle. Such amphibious tow vehicles are known such as can be seen and described in the above listed John B. Coast patents, each hereby incorporated herein by reference. In general, such amphibious vehicles 11 have spaced apart pontoons 12, 13. Each pontoon 12, 13 typically is fitted with an endless belt or track 14. A transverse, elevated platform 15 as shown in FIG. 2 connects to the pontoons 12, 13 and spaces them apart. The transverse platform 15 can have an operators station 16 or cabin, an engine, and hydraulic components (see FIGS. 1-2).

Figure 3:
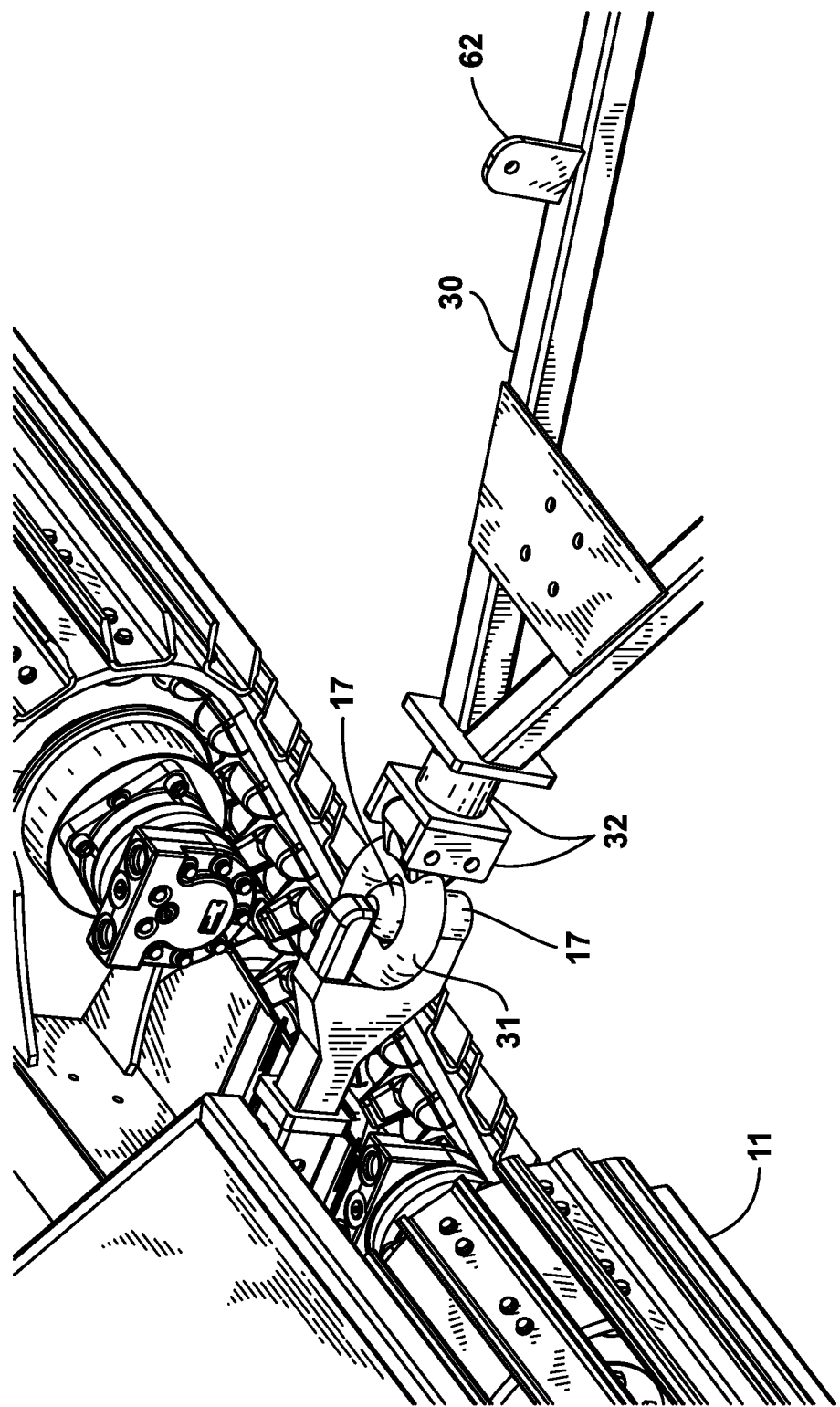
FIG. 3 is a partial perspective view of a preferred embodiment of the apparatus of the present invention.
Figure 4:
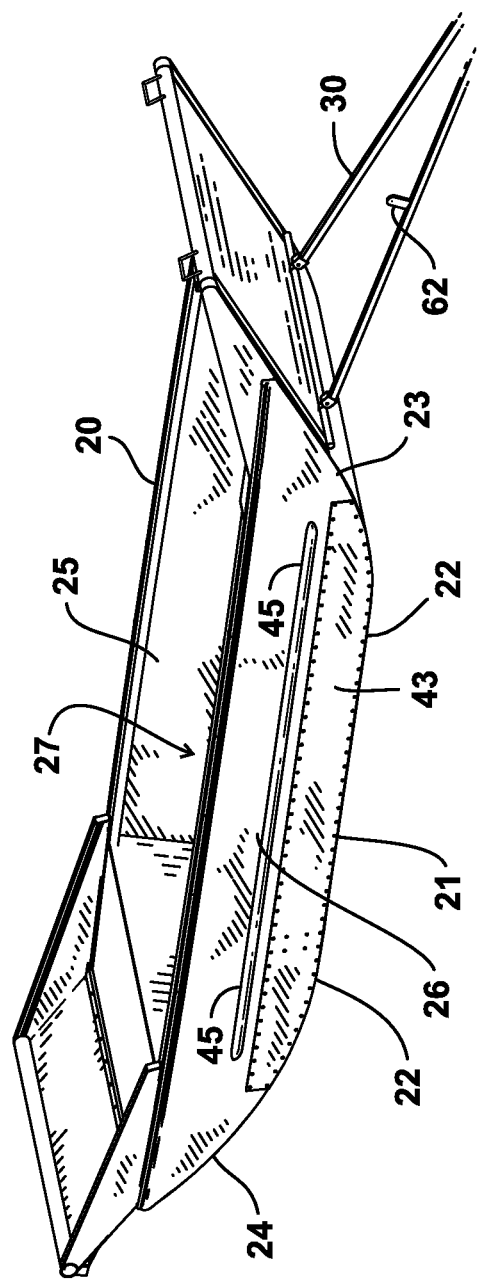
FIG. 4 is a partial perspective view of a preferred embodiment of the apparatus of the present invention.

In a preferred embodiment, a connecting part/ball/hitch 17 is provided at the aft or stern end portion of amphibious vehicle 11 (see FIG. 3). As shown in FIGS. 1-13 for example, a sled or load carrying buoyant hull 20 of improved configuration is provided. The sled 20 has a bottom 21 that can include a central, generally flat section 22. The bottom 21 also can include forward rake 23 and aft rake 24. The sled 20 has sidewalls 25, 26, forward edge 55 and an interior 27 that can be used to contain personnel and/or equipment to be transported. The interior 27 preferably has a floor 18 that can be used as a work platform for holding equipment, supplies, or personnel. Sled 20 can be of welded metal (e.g., aluminum) construction. Personnel can walk upon floor 18 when accessing equipment or performing jobs such as maintenance. Transportable equipment can include, for example: motors, pumps, blasting equipment, tools, pipe, paint, or the like.

Sled 20 preferably has a tow bar 30 connected to forward rake 23 as shown in FIGS. 1-13. Tow bar 30 can have a connecting part or eyelet 31 and a universal joint or swivel at 32 (see FIGS. 3 and 11 and 19-20). This arrangement of connecting part/eyelet 31 and universal joint or swivel 32 enable articulation between the amphibious tow vehicle 11 and sled 20.

Figure 5:
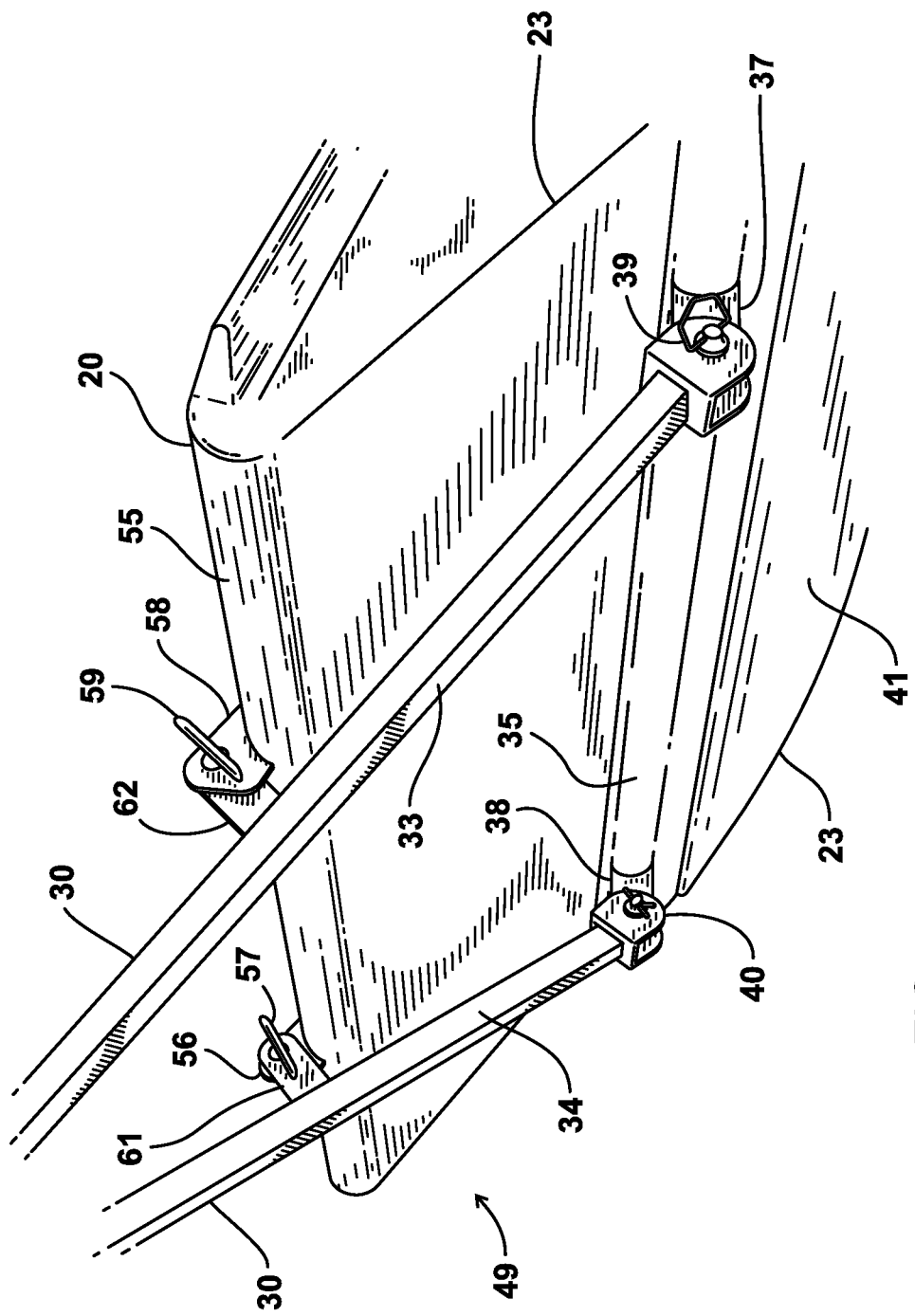
FIG. 5 is a partial perspective view of a preferred embodiment of the apparatus of the present invention.
Figure 6:
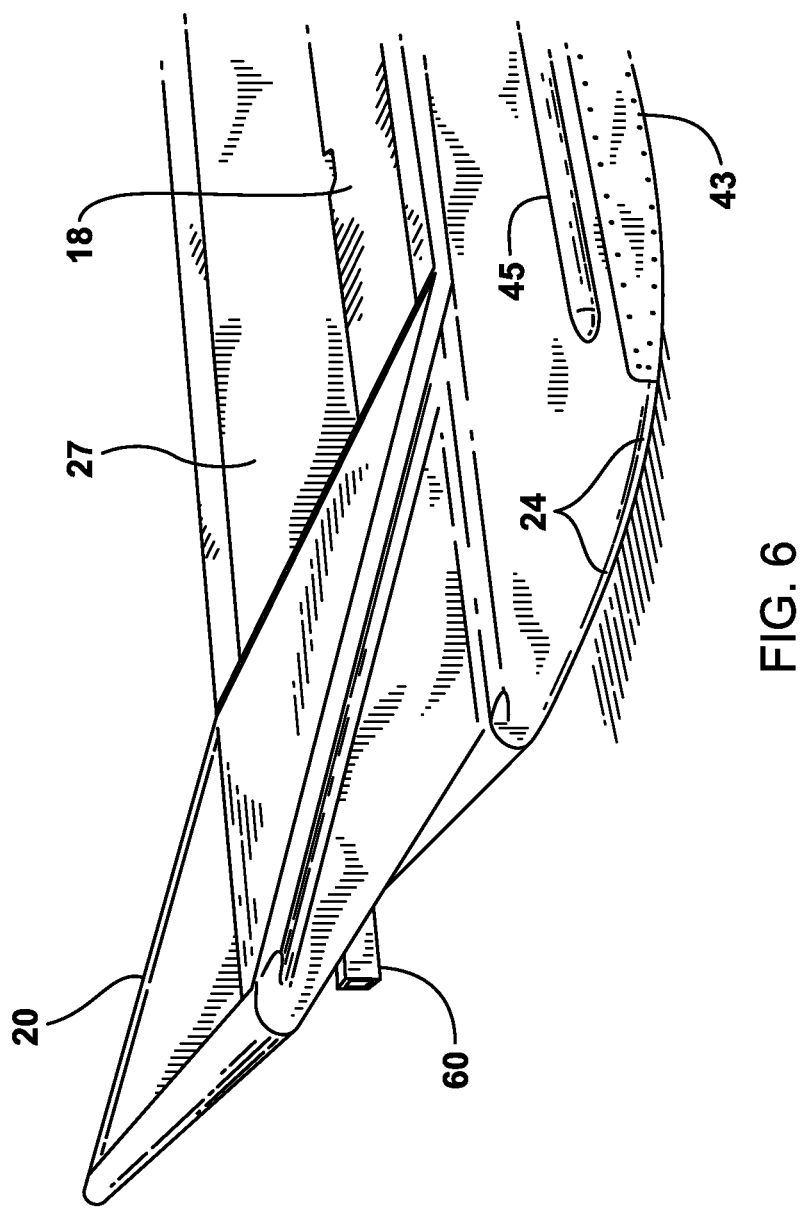
FIG. 6 is a partial perspective view of a preferred embodiment of the apparatus of the present invention.
Figure 7:
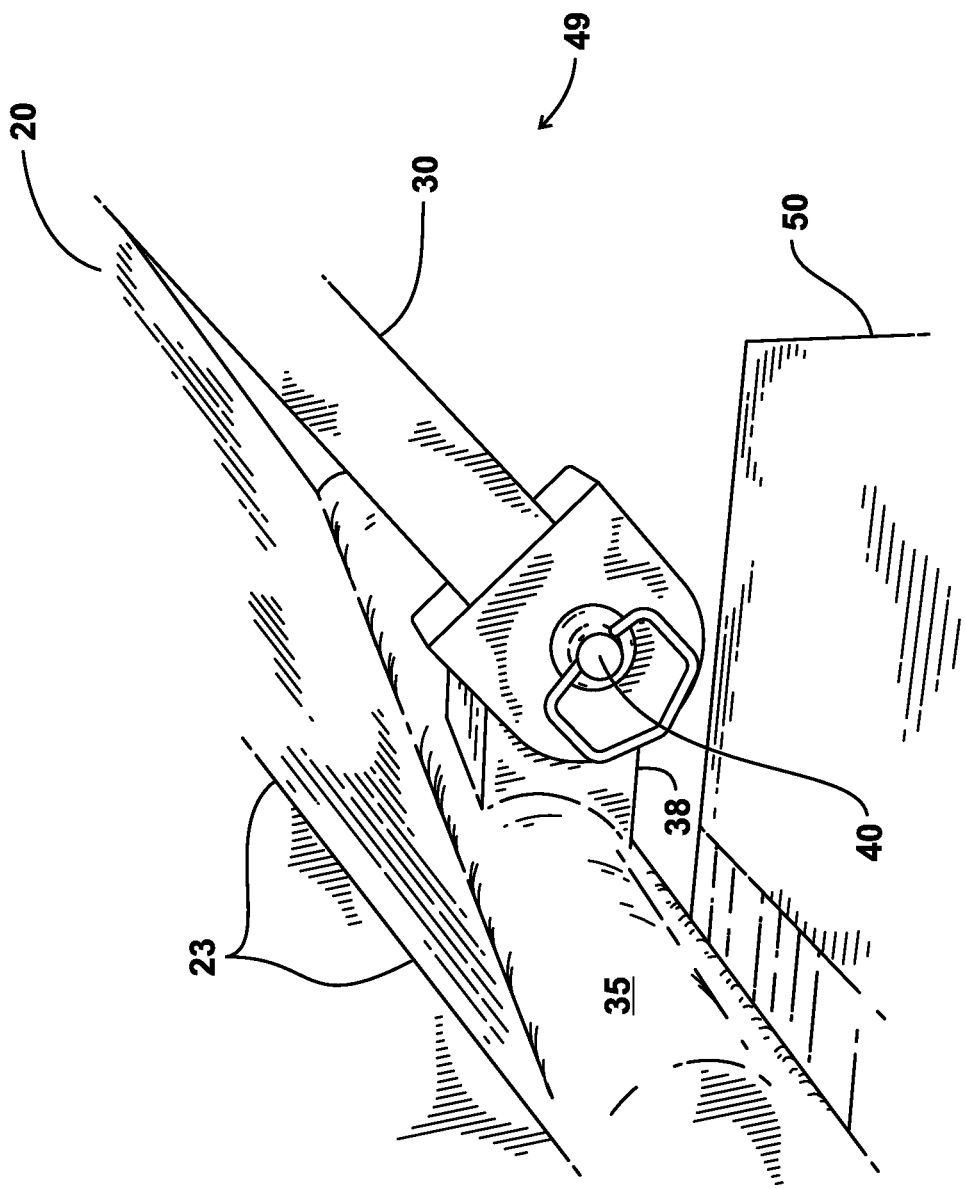
FIG. 7 is a partial perspective view of a preferred embodiment of the apparatus of the present invention.
Figure 11:
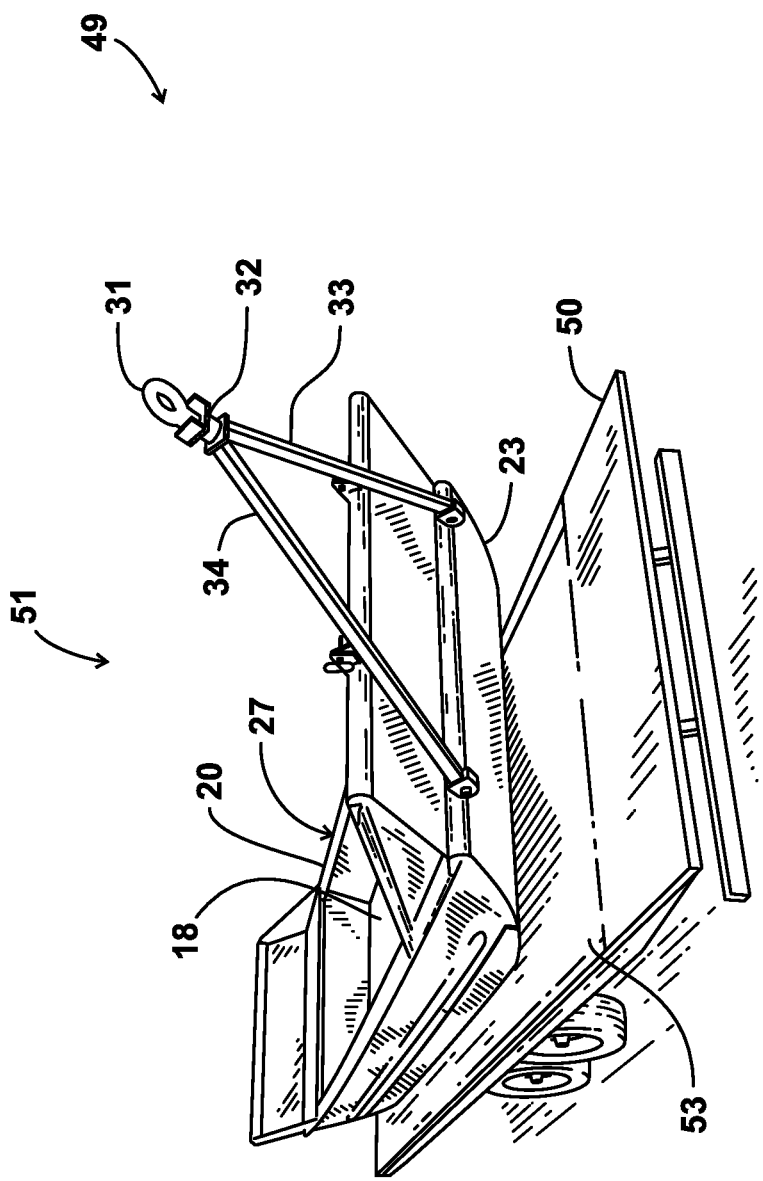
Figure 12:
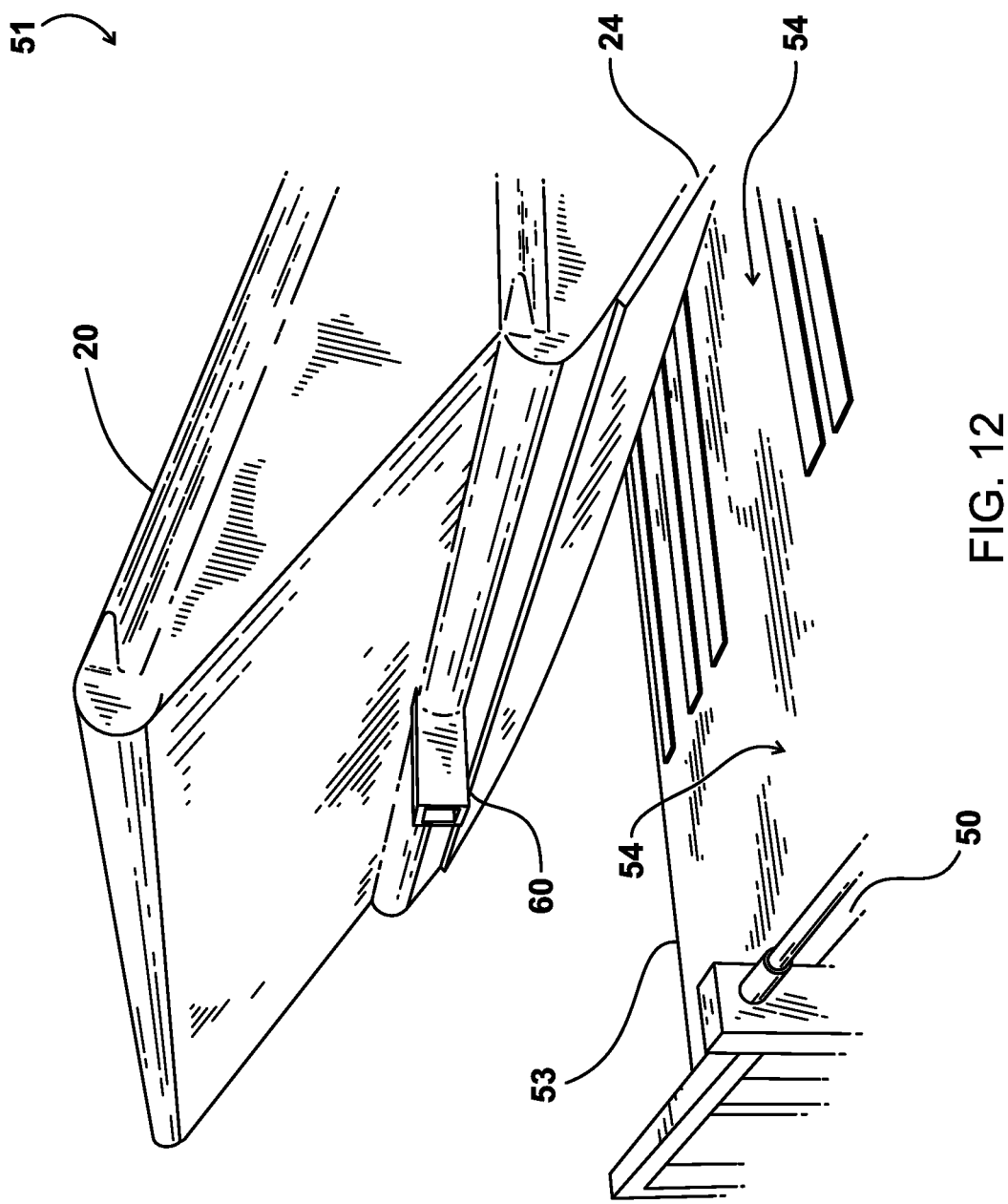
Figure 13:
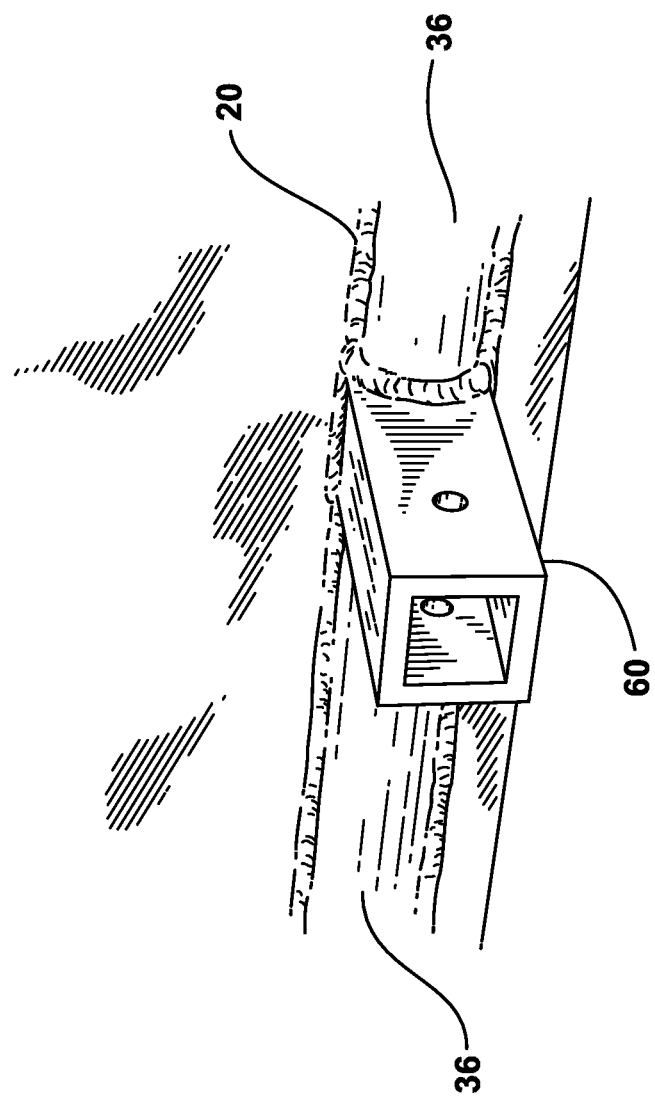

The tow bar 30 has a first arm or strut 33 and a second arm or strut 34. The arms, struts 33, 34 connect to transverse edge 35 of sled 20 as shown in FIGS. 5, 7, 11 for example. A similar transverse edge 36 is provided at the aft or stern end of sled 20 and can be fitted with receiver or hitch 60 as shown in FIG. 12. Hitch 60 can be fitted with a commercially available ball, eyelet or other hitch that enables connection to a second sled 20 wherein amphibious craft 11 pulls both first and second sleds 20, one behind the other. Spaced apart gussets/plates/eyelets 37, 38 can be provided on edge 35. A pinned or pivotal connection can be formed between each arm/strut/bar 33, 34 and a gusset or plate or eyelet 37, 38 as shown in FIGS. 5, 11. A pinned connection or pivot 39, 40 can be formed using a locking pin. Such locking pins are commercially available.

Sled 20 bottom 21 can be fitted with a polymer layer/layer of material 41 such as plastic or other low friction material. Such a polymer layer 41 (see FIG. 18) can extend from side to side between side walls 25, 26 and forward to aft, extending to and covering forward rake 23 (at edge 35) to and covering and aft rake 24 (at edge 36).

Figure 8:
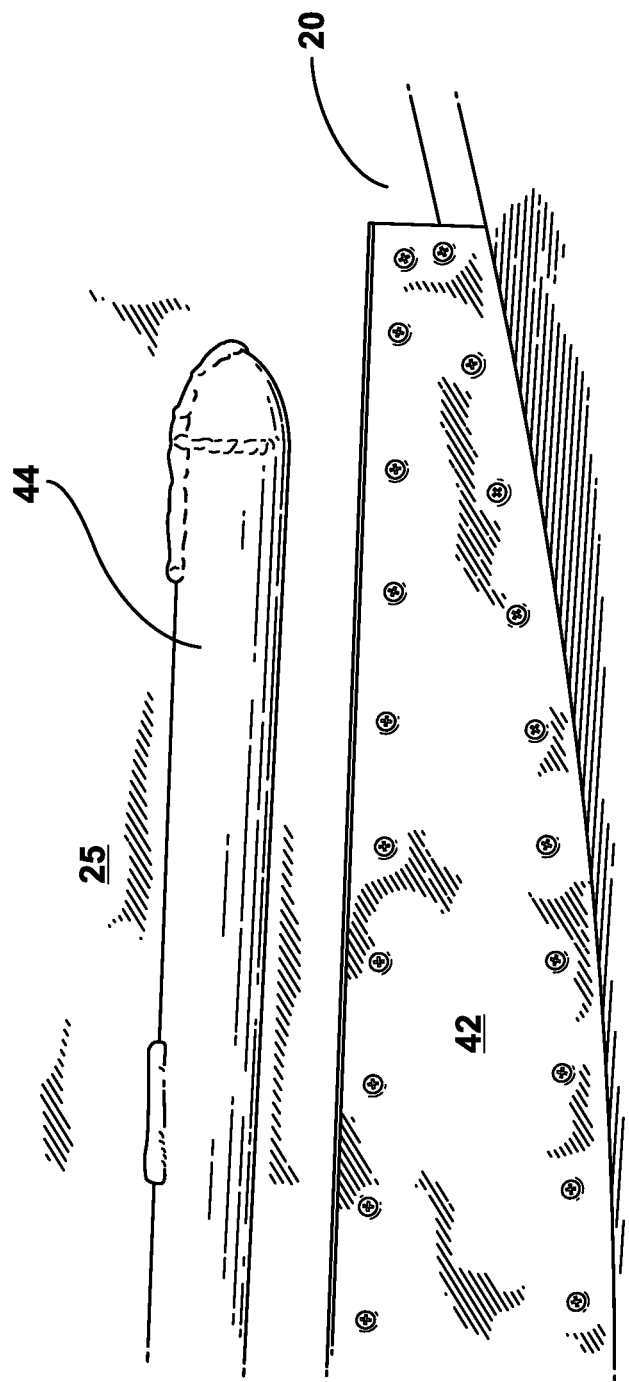
FIG. 8 is a partial perspective view of a preferred embodiment of the apparatus of the present invention.
Figure 9:
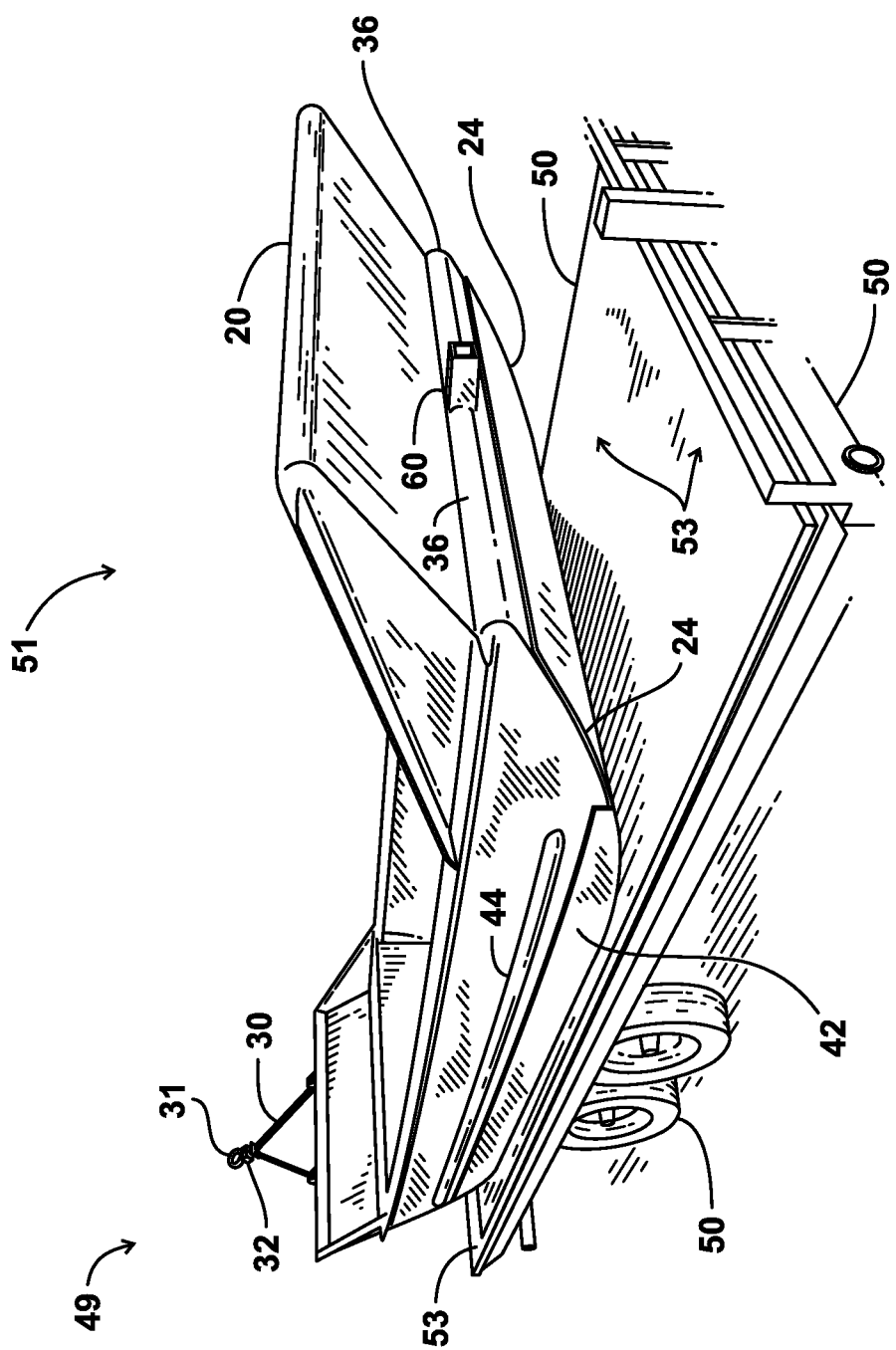
FIG. 9 is a partial perspective view of a preferred embodiment of the apparatus of the present invention showing the sled or load carrying hull in travel or transport position.
Figure 10:
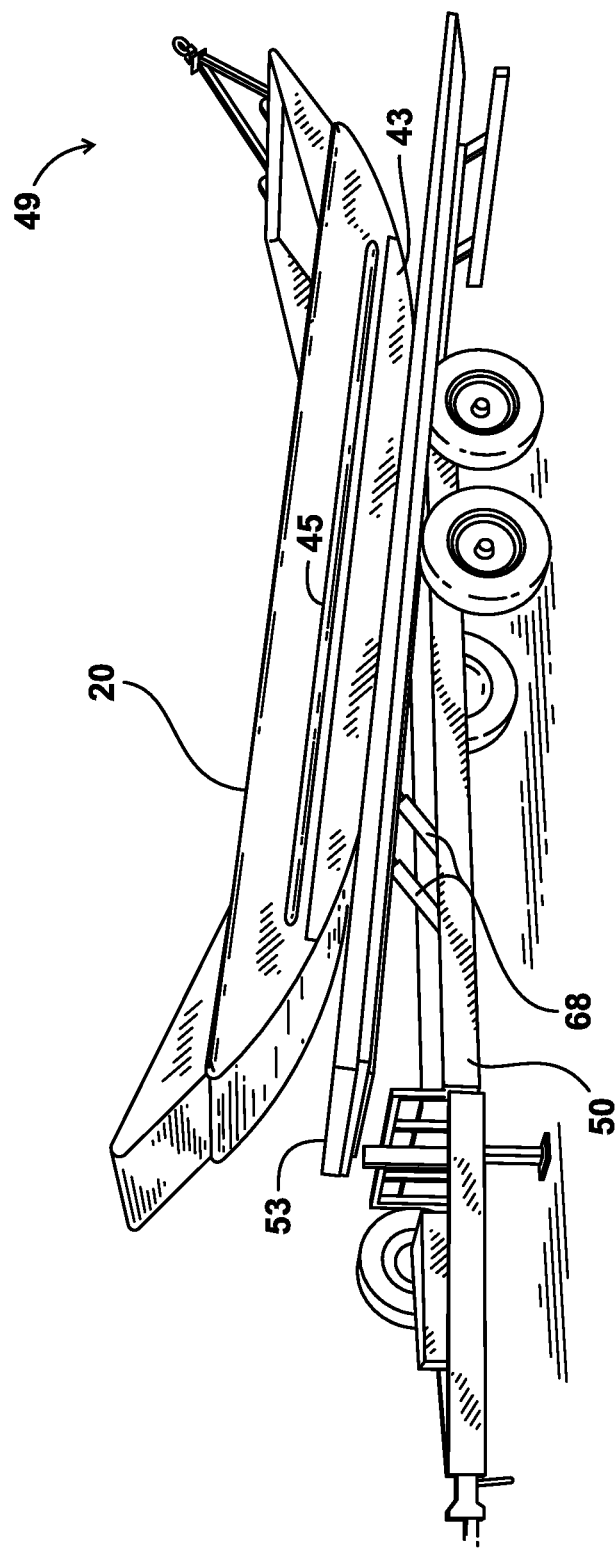
FIGS. 10-17 are perspective views of a preferred embodiment of the apparatus of the present invention illustrating the method of the present invention when loading the sled device on a transport trailer.
Figure 16:
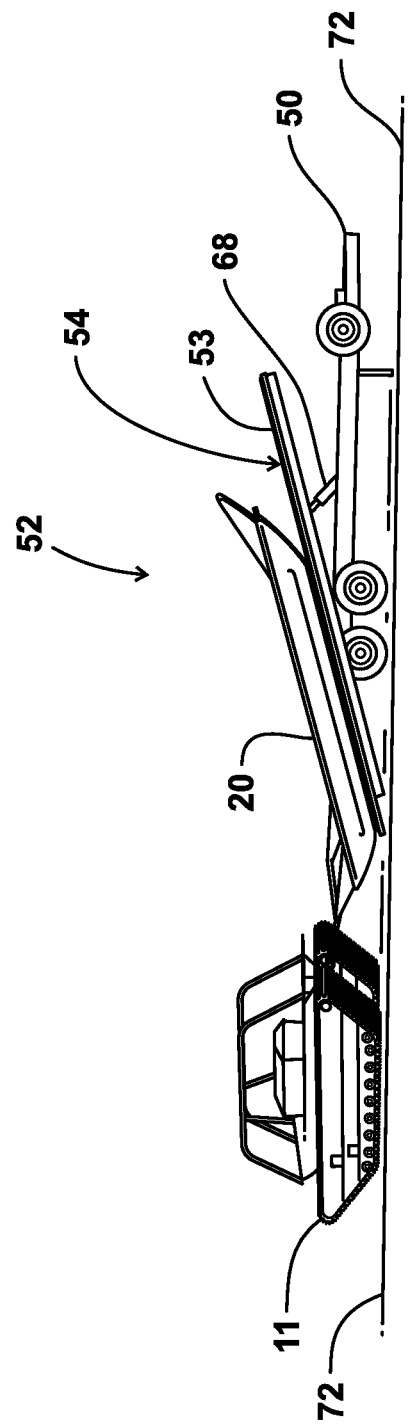
Figure 17:
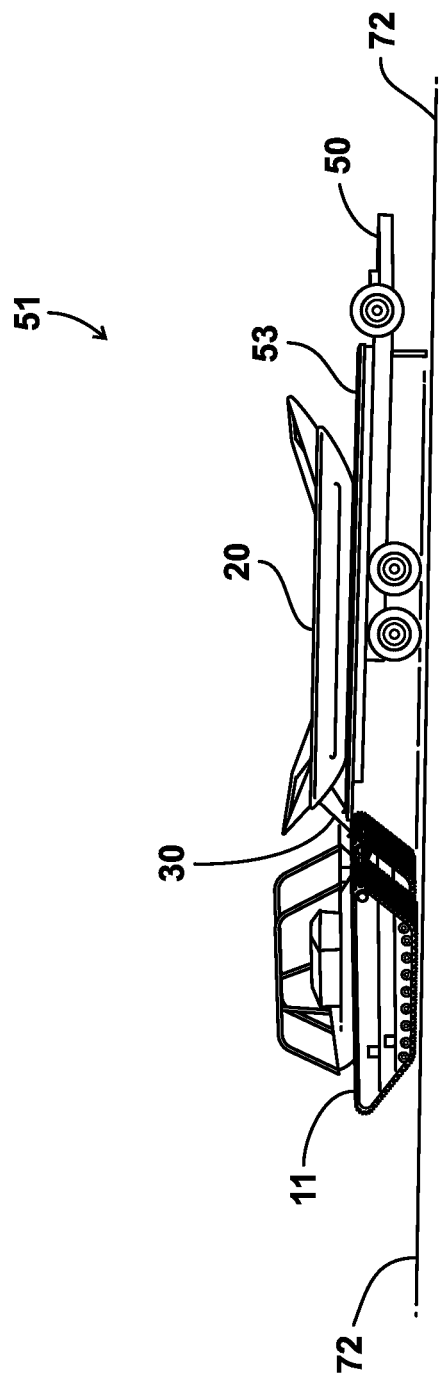
Figure 18:
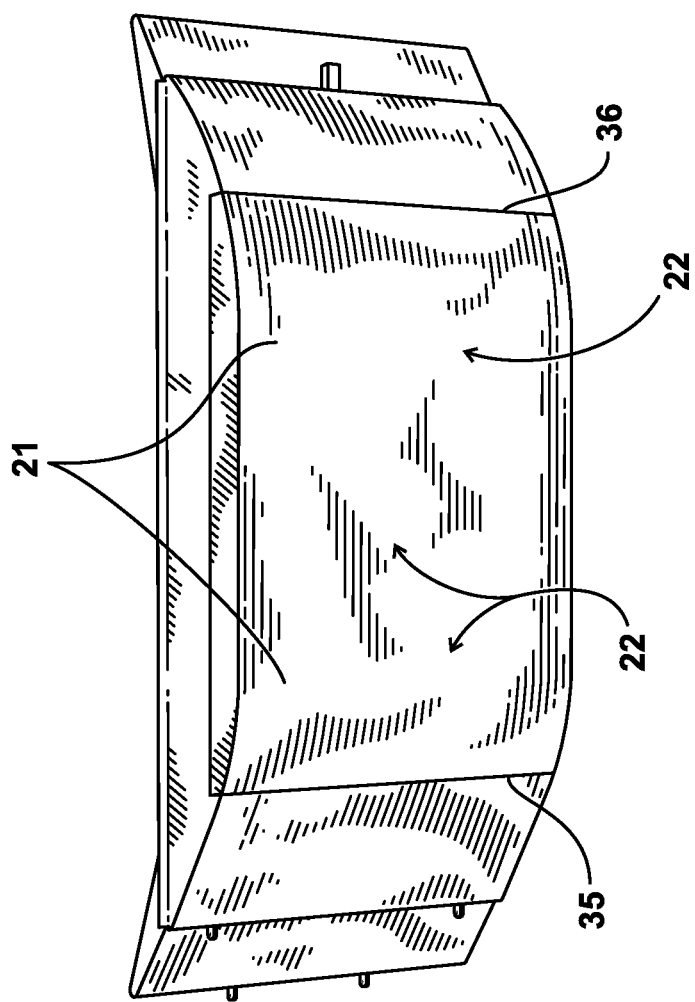
FIG. 18 is a partial bottom view of a preferred embodiment of the apparatus of the present invention.

A polymer layer of material, or plastic layer, or layer of low friction material (e.g., UHMW polyurethane or Teflon®) can be provided on side or side wall 25 as layer 42 (see FIGS. 8, 16-17). Similarly, side or side wall 26 can provide layer of material at 43 which can be a polymer layer, plastic layer or layer of low friction material (see FIGS. 4, and 6, 10-11). Fasteners such as screws or other threaded fasteners can be used to secure the layers 41, 42, 43 to the sled 20. Sled 20 can thus slide upon layer 41. Each of the sides or side walls 25, 26 can be fitted with a longitudinal rib or bumper 44, 45. The side wall 25 has longitudinal rib or bumper 44. The side wall 26 has longitudinal rib or bumper 45. Layers 41, 42, 43 can be between about ⅛ and ¾ inches thick.

In the figures, e.g., in FIGS. 9-17, there can be seen a trailer 50 which can be used to transport sled 20. Trailer 50 preferably has a lowered travel position 51 and an inclined position or loading position 52. Such a trailer 50 is commercially available, including a trailer bed or platform 53 with an upper surface 54 and wherein bed 53 is preferably movable. Expandable cylinders 68 (e.g., hydraulic cylinders or pneumatic cylinders or a rack and pinion arrangement) can be used to elevate bed 53 between an elevated or inclined position 52 (see FIGS. 14-16) and a flat or travel position 51 (see FIGS. 9, 11, 17).

The tow bar 30 can be stored in an upper, storage or transport position 49 using a gusset, plate or padeye 56 and locking pin 57 as shown in FIGS. 5, 11. Another gusset or plate or padeye 58 is spaced from the gusset/plate/padeye 56 and can be used to lock the bar 30 in an upper position 49 with locking pin 59. Each of the bar arms 33, 34 has a gusset/plate/padeye 61, 62 as shown. In order to secure the tow bar 30 in an upper, transport position 49, a user can place a locking pin 57 or 59 through gusset plate or padeye 56 or 58 and through the gusset or plate or padeye 61 or 62 on the tow bar 30 (see FIGS. 5, 11). This transport position 49 of the tow bar 30 can be seen in FIG. 5.

Figure 14:
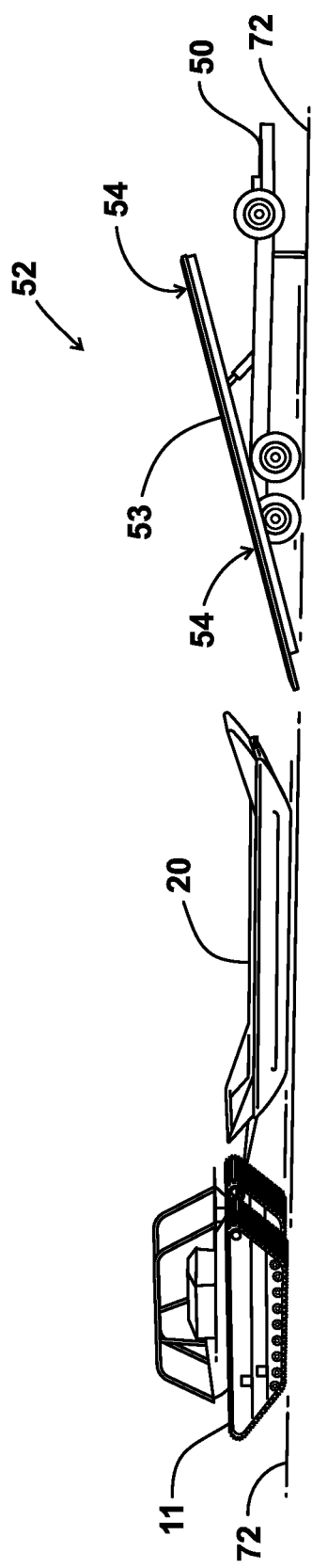
Figure 15:
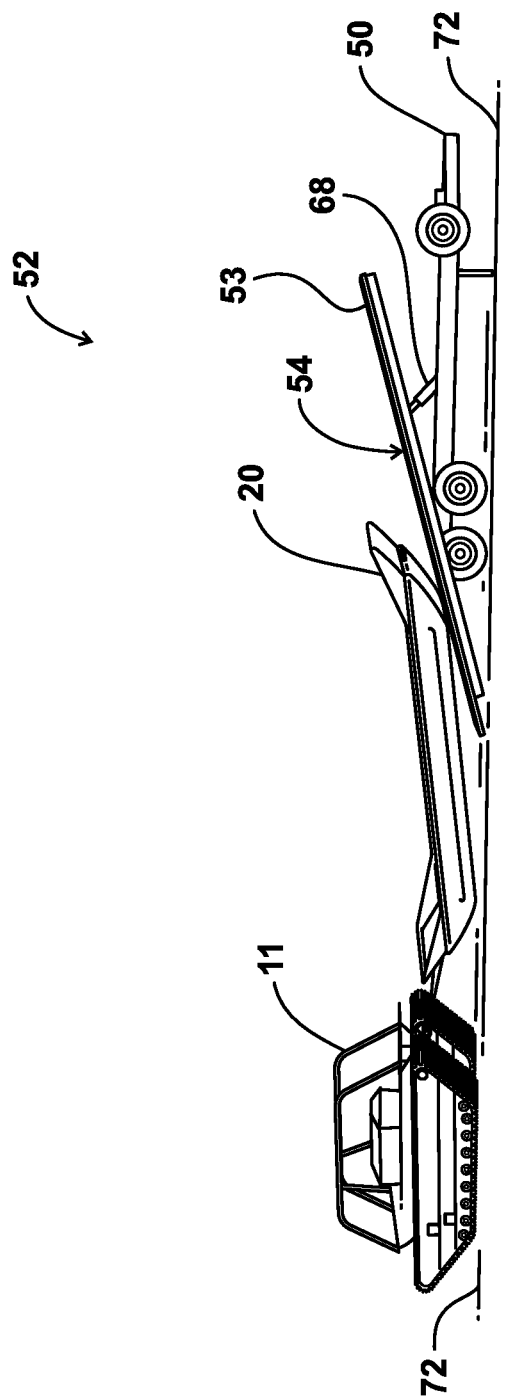

FIGS. 14-17 and 19-20 illustrate a loading of sled 20 upon trailer 50 and more particularly upon a trailer 50 bed or platform 53 having upper surface 54. In FIG. 14, the amphibious vehicle 11 is shown connected to sled 20. Trailer 50 has been placed in the loading or inclined position 52. In FIG. 15-17, the amphibious vehicle 11 has pushed sled 20 so that the bottom 21 of sled 20 engages upper surface 54 of trailer bed or platform 53.

Figure 19:
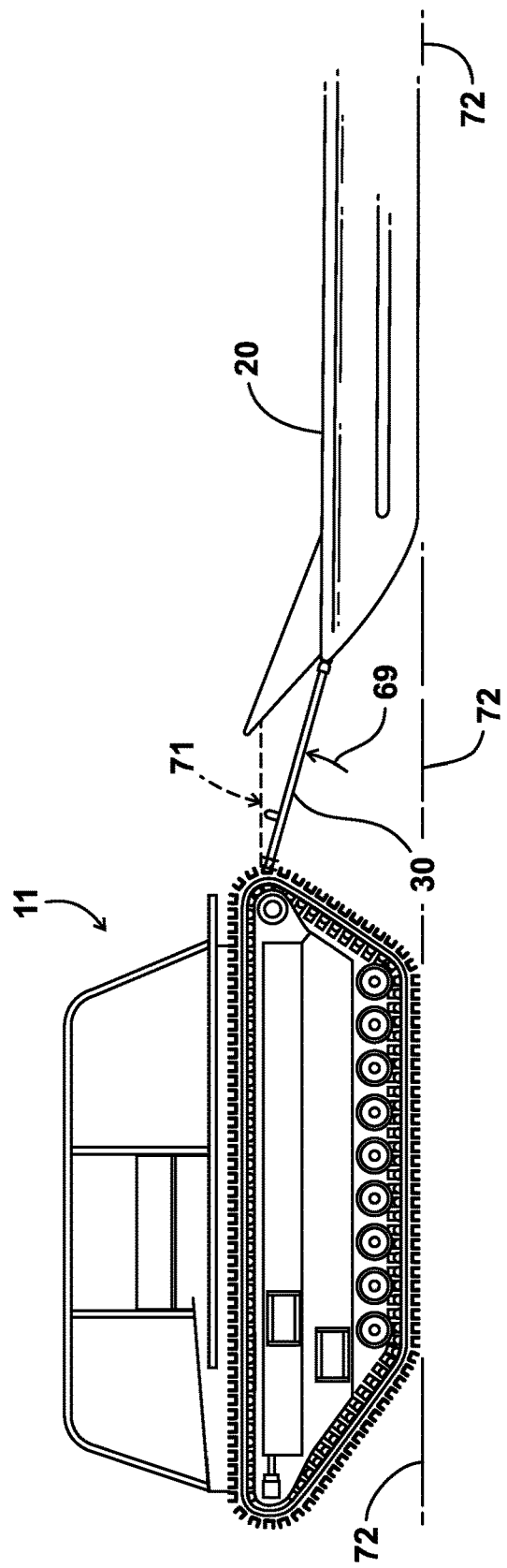
FIGS. 19-20 are fragmentary views of a preferred embodiment of the apparatus of the present invention showing tow bar angular position just prior to loading on the transport trailer and after loading is complete.
Figure 20:
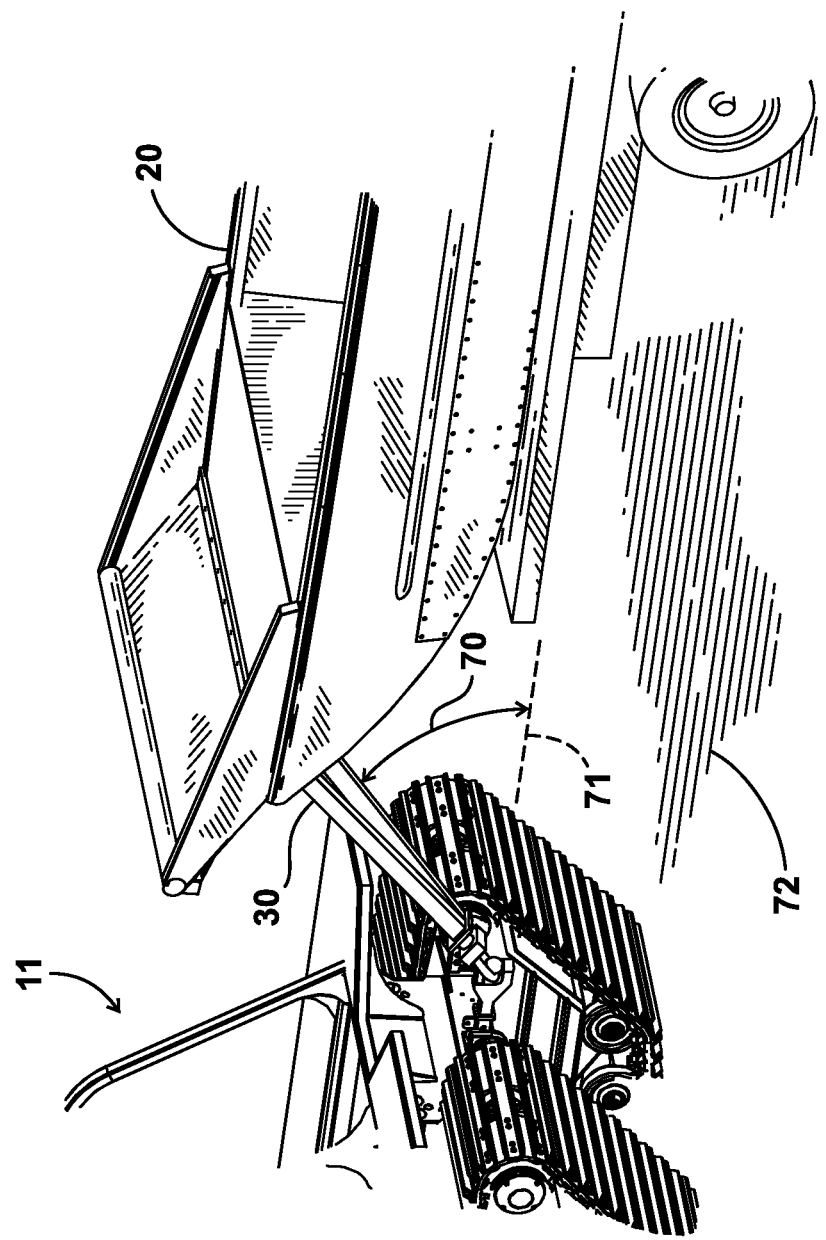

Notice in FIG. 19 that the tow bar 30 forms an acute angle 69 with a horizontal plane 71. In FIG. 19, tow bar 30 is lower at its attachments to sled 20 at pivots 39, 40 and higher at its attachment to vehicle 11 at hitch 17. In this position, if a horizontal plane is defined as zero degrees, tow bar 30 forms an angle with horizontal of between about −10 and −60 degrees (see FIG. 19). In FIG. 19, the sled 20 and vehicle 11 are both resting on the earth's surface 72. In FIGS. 14-17, as the amphibious vehicle 11 moves toward trailer 50, the tow bar 30 forms an increasingly larger acute angle with horizontal, beginning with an initial angle 69 of about −10 to −60 degrees to a final angle 70 of about 20-60 degrees (see FIG. 20). The sled 20 forms an acute angle of about 20-60 degrees with a horizontal plane 71 once the sled is positioned upon the trailer 50 bed 53 and the trailer 50 moved to the travel position 51 (FIGS. 17 and 20) and wherein the amphibious vehicle 11 remains upon the surface of the earth at 72 or like underlying surface (see FIGS. 17 and 20).

The sled 20 is pushed by vehicle 11 onto the trailer 50 bed 53 while bed 53 is in inclined position 52. The bed 53 can then be lowered toward the travel position 51 and preferably when the tow bar 30 is connected to the sled 20 (see FIGS. 17 and 20), thus preventing the sled 20 from sliding off of the trailer 50 bed 53. Once the angle of the trailer bed 53 with respect to horizontal 71 has been reduced (see travel position 51, FIG. 17), the tow bar 30 can be disconnected from the sled 20 using the disconnectable pin connection at 39, 40. If sled 20 is mistakenly disconnected from amphibious vehicle 11 before loading to position 52 is completed (e.g. the FIG. 16 position), the sled 20 could possibly shift positions or possibly slide relative to the trailer bed 30.

In one embodiment, one of the rakes 23 or 24 includes a ramp 65 that is movable between elevated and lowered positions. Ramp 65 is hinged to sled 20 at hinge 66. Ramp 65 can be secured in the closed position using closure pins 67 or other closure device, latch or lock(s). The following is a list of parts and materials suitable for use in the present invention:

PARTS LIST

| PART NUMBER | DESCRIPTION |
|---|---|
| 10 | amphibious transport system |
| 11 | amphibious tow vehicle |
| 12 | pontoon |
| 13 | pontoon |
| 14 | endless belt/track |
| 15 | transverse platform |
| 16 | operators station/cabin |
| 17 | connecting part/ball/hitch |
| 18 | floor |
| 20 | sled/hull |
| 21 | bottom |
| 22 | central, generally flat section |
| 23 | forward rake |
| 24 | aft rake |
| 25 | side wall/side |
| 26 | side wall/side |
| 27 | interior |
| 30 | tow bar |
| 31 | connecting part/eyelet |
| 32 | universal joint/swivel |
| 33 | arm/strut/bar |
| 34 | arm/strut/bar |
| 35 | transverse edge |
| 36 | transverse edge |
| 37 | gusset/plate/eyelet |
| 38 | gusset/plate/eyelet |
| 39 | pinned connection/pivot |
| 40 | pinned connection/pivot |
| 41 | polymer layer/layer of material |
| 42 | polymer layer/layer of material |
| 43 | polymer layer/layer of material |
| 44 | longitudinal rib/bumper |
| 45 | longitudinal rib/bumper |
| 49 | upper or transport/storage position |
| 50 | trailer |
| 51 | travel position |
| 52 | inclined position/loading position |
| 53 | trailer bed/platform |
| 54 | upper surface |
| 55 | forward edge |
| 56 | gusset/plate/padeye |
| 57 | locking pin |
| 58 | gusset/plate/padeye |
| 59 | locking pin |
| 60 | receiver/hitch/square tubing |
| 61 | gusset/plate/padeye |
| 62 | gusset/plate/padeye |
| 65 | ramp |
| 66 | ramp hinge |
| 67 | latch/pin/closure |
| 68 | hydraulic/pneumatic cylinders/lift cylinders |
| 69 | angle |
| 70 | angle |
| 71 | horizontal line |
| 72 | earth's surface |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An amphibious transport apparatus comprising:
  a) an amphibious craft having forward and aft ends, a pair of spaced apart pontoons, a transversely extending structure that spans between the pontoons and connecting the pontoons together;
  b) wherein the transversely extending structure includes a platform having a user's control station and a transom in front of the aft end of said amphibious craft;
  c) a sled vessel that has a flat bottom, side walls extending up from the bottom, forward and aft rakes, and a rigid tow bar pivotally attached to the vessel at one of the rakes at a pivotal connection;
  d) a releasable connection that enables the tow bar to releasably attach to the amphibious craft at said transom, the releasable connection including a first connector on the amphibious craft and a second connector on the tow bar;
  e) wherein said tow bar is rotatable between an upper storage position wherein the tow bar engages the vessel away from said pivotal connection and a lower towing position;
  f) a towing position of said amphibious craft and sled vessel defined by the sled vessel connected to the amphibious craft with said first and second connectors, the amphibious craft being self propelled with tracks engaging underlying terrain and the sled vessel bottom dragging on the underlying terrain.

2. The amphibious transport apparatus of claim 1 wherein in the lower towing position the second connector portion is above the sled vessel bottom.

3. The amphibious transport apparatus of claim 1 wherein the sled vessel has a length and the said rakes have a combined length that is about half the length of the sled vessel.

4. The amphibious transport apparatus of claim 3 wherein the bottom and part of the rakes are lined with a polymeric layer of material.

5. The amphibious transport apparatus of claim 1 wherein the tow bar attaches to the amphibious craft at a position in between the pontoons.

6. The amphibious transport apparatus of claim 1 wherein the bottom and part of the rakes are lined with a polymeric layer of material.

7. The amphibious transport apparatus of claim 1 wherein at least a part of the sides are lined with a polymeric layer of material.

8. The amphibious transport apparatus of claim 1 wherein at least part of the bottom and at least part of the rakes are covered with a layer of polymeric material.

9. The amphibious transport apparatus of claim 1 wherein the amphibious craft has a length and the sled has a length that is greater than the length of the amphibious craft.

10. The amphibious transport apparatus of claim 1 wherein the amphibious craft has a towing capacity and the sled when connected to the amphibious craft with said first and second connectors generates a drag on said amphibious craft that is less than half of said towing capacity.

11. The amphibious transport apparatus of claim 1 wherein the amphibious craft has a towing capacity and the sled when connected to the amphibious craft with said first and second connectors generates a drag on said amphibious craft that is less than twenty five percent of said towing capacity.

12. The amphibious transport apparatus of claim 1 wherein the amphibious craft has a towing capacity and the sled when connected to the amphibious craft with said first and second connectors generates a drag on said amphibious craft that is less than ten percent of said towing capacity.

13. The amphibious transport apparatus of claim 1 wherein the amphibious craft has forward and reverse mobility and wherein the amphibious craft pushes the sled when in reverse.

14. The amphibious transport apparatus of claim 13 wherein the amphibious craft and sled vessel are so configured in the towing position that the amphibious craft is able to push the sled into a body of water wherein the amphibious craft is above the sled on a higher terrain while the sled vessel bottom is in a lower position on a water surface of said body of water.

15. The amphibious transport apparatus of claim 14 wherein the amphibious craft and sled are so configured in the towing position that the amphibious craft is able to push the sled vessel upwardly and upon a bed of an inclined trailer wherein the amphibious craft is below the sled on an underlying terrain while the sled is in a higher position on the bed of said inclined trailer.

16. The amphibious transport apparatus of claim 13 wherein the amphibious craft and sled are so configured in the towing position that the amphibious craft is able to push the sled upwardly and upon a bed of an inclined trailer wherein the amphibious craft is below the sled vessel bottom on an underlying terrain while the sled vessel bottom is at a higher position on the bed of said inclined trailer.

17. The amphibious transport apparatus of claim 1 wherein the amphibious craft has a maximum load carrying capacity of about 2,000 pounds.

18. The amphibious transport apparatus of claim 1 wherein the sled vessel has a load carrying capacity of about 2,000-5,000 pounds.

19. The amphibious transport apparatus of claim 1 wherein the sled vessel has a load carrying capacity of about 3,500 pounds.

20. The amphibious transport apparatus of claim 1 wherein the sled vessel has a greater length than the length of the amphibious craft.

21. The amphibious transport apparatus of claim 1 wherein a load carrying capacity of the sled vessel is greater than a load carrying capacity of the amphibious craft.

22. A method of transporting personnel and or equipment to a remote locale that includes marsh, wetland and/or water, comprising the steps of:
   a) providing an amphibious craft having forward and aft ends, a pair of spaced apart pontoons, a transverse platform that spaces the pontoons apart and includes an operator's control station and a transom in front of said aft end, endless tracks around each pontoon, and a drive system that drives the tracks relative to the pontoon, said drive system enabling the craft to travel in forward or reverse directions;
   b) providing a sled having a flat bottom, a top, side walls, forward and aft rakes and a cargo deck that has an area greater than the area of said platform;
   c) connecting the sled to the amphibious craft with a rigid tow bar that is pivotally attached to the sled and pivotally attached to the transom of the amphibious craft at a connector to define a connected position, wherein the flat bottom of the sled is configured to drag on underlying terrain when the tracks of the amphibious craft engages the underlying terrain;
   d) selectively pulling or pushing the sled with the amphibious craft when in said connected position;
   e) wherein the connected position is so configured that the sled can be pushed when the sled bottom is selectively either above the amphibious craft, below the amphibious craft, or at the same level as the amphibious craft; and
   f) filling the cargo deck with personnel and/or equipment to be transported.

23. The method of claim 22 further comprising the step of providing a trailer having a bed that is movable between an inclined loading position and a travel position, wherein in step "e" the trailer bed is in the inclined loading position and further comprising the steps of the amphibious craft pushing the sled upon the bed and moving the trailer bed to the travel position.

24. The method of claim 23 wherein the tow bar connection to the sled is higher than the tow bar connection to the amphibious craft in the travel position.

25. The method of claim 24 wherein the tow bar is connected to the amphibious craft and to the sled when moving from inclined loading position to travel position.

26. The method of claim 22 further comprising placing a layer of polymer on the bottom of the sled.

27. The method of claim 22 wherein in step "c" the tow bar can be pivoted above the top of the sled.

28. The method of claim 22 wherein in step "c" the tow bar can be pivoted below the bottom of the sled.

29. The method of claim 22 wherein in step "c" the tow bar connector includes a universal joint.

30. The method of claim 22 wherein in step "c" the tow bar connector is connected to the amphibious craft at a first elevational position and to the sled at a second elevational position that is lower than said first elevational position.

31. The method of claim 22 wherein the amphibious craft has a maximum load carrying capacity of about 2,000 pounds.

32. The method of claim 22 wherein the sled has a load carrying capacity of about 2,000-5,000 pounds.

33. The method of claim 22 wherein the sled has a load carrying capacity of about 3,500 pounds.

34. The method of claim 22 wherein the sled has a greater length than the length of the amphibious craft.

35. The method of claim 22 wherein a load carrying capacity of the sled is greater than a load carrying capacity of the amphibious craft.

* * * * *